Dec. 13, 1960 J. E. STRAUB 2,963,915
TORQUE SOLENOID
Filed Feb. 2, 1959 2 Sheets-Sheet 1
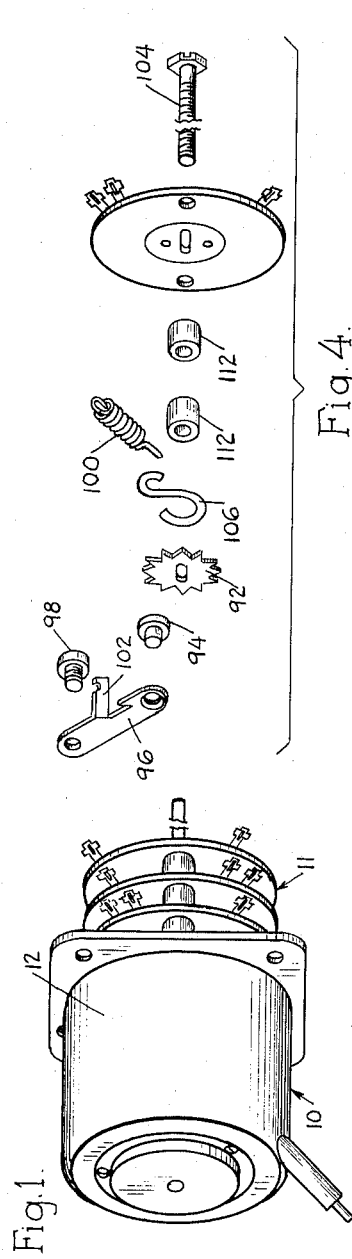
Fig.1.
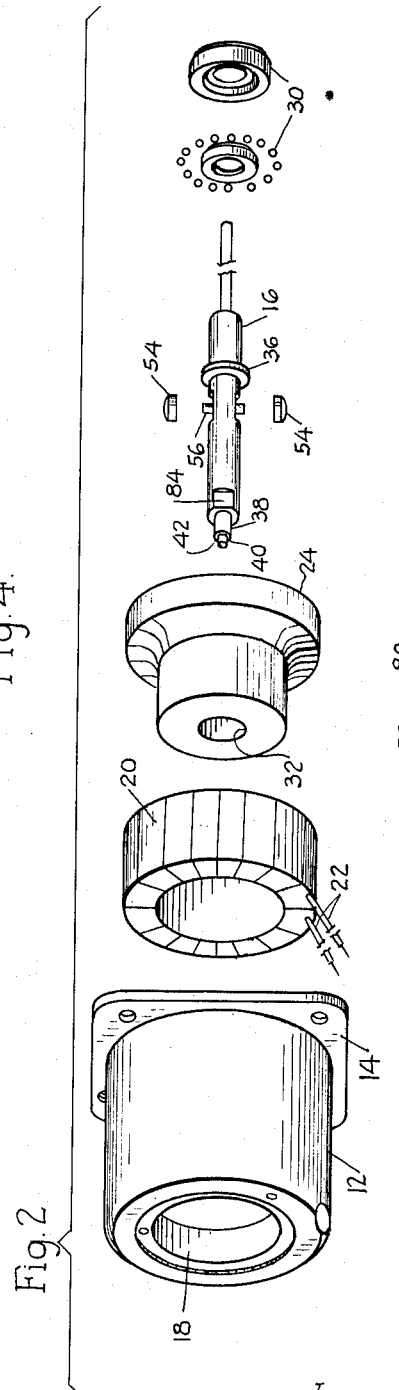
Fig.2.
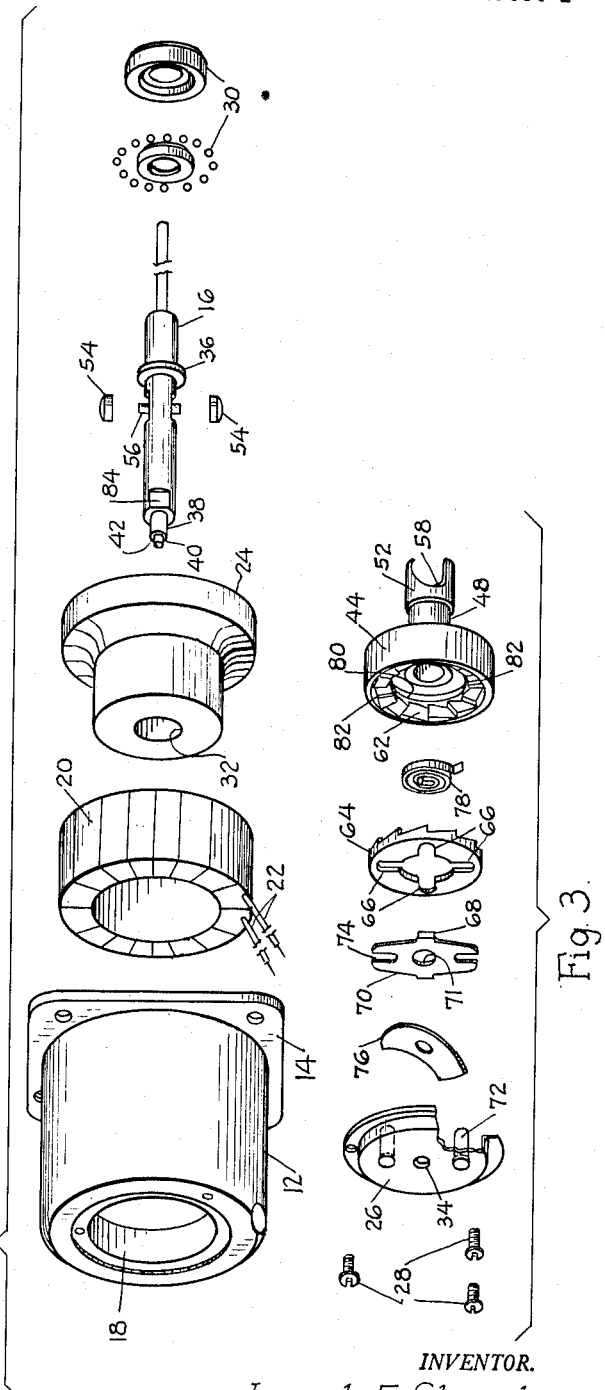
Fig.3.
Fig.4.
INVENTOR.
Joseph E. Straub.
BY
Robert W. Beart
HIS ATTORNEY.

Dec. 13, 1960
J. E. STRAUB
2,963,915
TORQUE SOLENOID
Filed Feb. 2, 1959
2 Sheets-Sheet 2
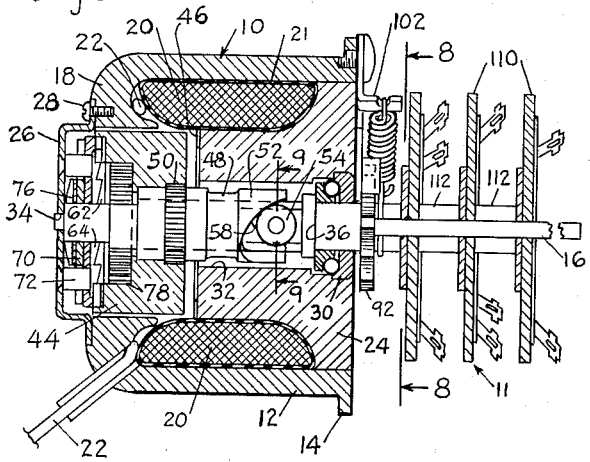
Fig.5
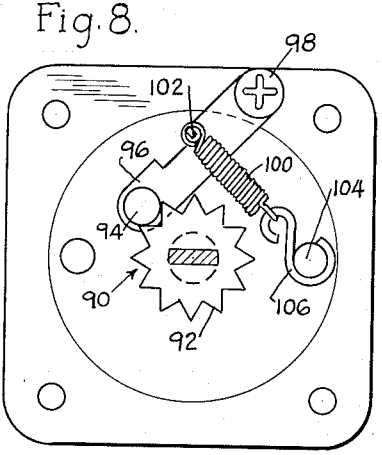
Fig.8.
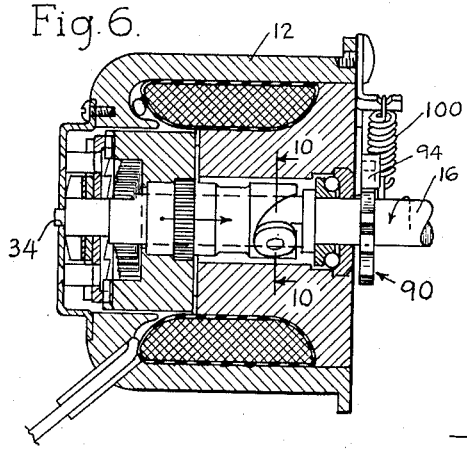
Fig.6.
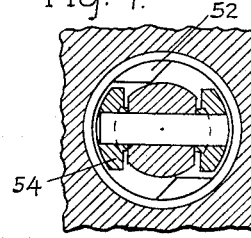
Fig.9.
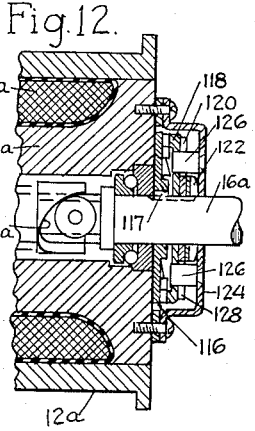
Fig.12.
Fig.10.
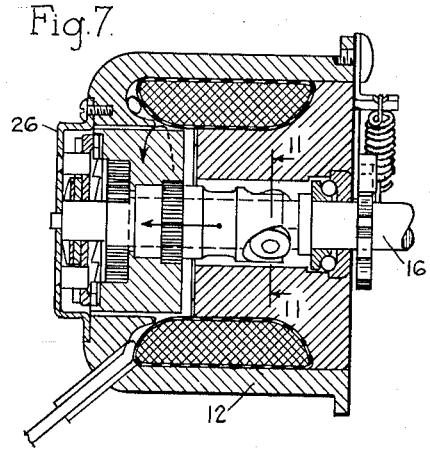
Fig.7.
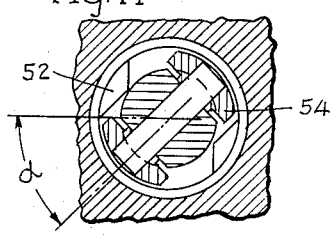
Fig.11
INVENTOR.
Joseph E. Straub.
BY
Robert W. Beart
HIS ATTORNEY.

United States Patent Office 2,963,915
Patented Dec. 13, 1960

2,963,915

TORQUE SOLENOID

Joseph E. Straub, Manhattan Beach, Calif., assignor, by mesne assignments, to Illinois Tool Works, Chicago, Ill., a corporation of Illinois Filed Feb. 2, 1959, Ser. No. 790,642

6 Claims. (Cl. 74—88)

This invention relates to an electro-magnetically operated rotary actuator, and more particularly to a solenoid whose output shaft is designed to provide rotary motion rather than linear motion. Such a solenoid is an improved torque solenoid of the type shown and described in my pending application Serial No. 532,681 filed September 6, 1955.

Basically such a device consists of an electro-magnet and an axial moveable armature which is adapted to move linearly upon energization of the electro-magnet. Such a linear movement is not always desired. In many instances, the actuator is of little value unless it provides a rotary movement capable of actuating a switch or similar device. A simple, compact operator is highly desirable in such instances and one which rotates a shaft is referred to in this material as a torque solenoid.

While there are some such solenoids presently available, in general these act to move the output shaft axially as well as to rotate it, and in many applications, all axial movement is to be avoided. A further limitation of such solenoids presently available is that they are capable only of an incremental movement of the output shaft with said output shaft returning to its original position upon release of the energization of the electro-magnetic means.

It is, therefore, a major object of this invention to provide a solenoid whose output shaft is rotatable without being axially moveable.

Another object of this invention is to provide a torque solenoid whose output shaft can be rotated incrementally in a constant direction without the necessity of the output shaft being returned to its initial position.

It is a further object of this invention to provide a torque solenoid whose output torque may be maintained substantially constant throughout the entire range of movement of the shaft, or may be varied as required.

Still another object of this invention is to provide a torque solenoid of simple construction which is easily fabricated and which is conducive to a design which by substantially total enclosure minimizes the effects of external conditions, such as dust, etc. and which because of a minimum of moving parts is capable of giving long trouble-free service.

These and other objects of this invention will become apparent to those skilled in the art from the following description of embodiments of this invention and from the drawings illustrating those embodiments in which:

Figure 1 is a perspective view of a preferred embodiment of the invention as utilized in actuating a bank of rotary wafer switches;

Figure 2 is an exploded view of the electro-magnetic components of this invention as well as the output shaft and associated bearings;

Figure 3 is an exploded view of the armature with the attached input shaft and the primary ratchet member associated with said armature;

Figure 4 is an exploded view of the secondary ratchet means and one of the wafer switches shown in Figure 1;

Figure 5 is an axial sectional view showing the various parts of the torque solenoid in their normal or initially de-energized position;

Figure 6 is an axial sectional view similar to Figure 5 but with the parts and the positions they assume when the solenoid is initially energized;

Figure 7 is an axial sectional view similar to Figures 5 and 6 showing the parts and the positions they will assume when the solenoid is de-energized after its initial energization;

Figure 8 is an elevation taken along lines 8—8 of Figure 5 showing the arrangement of the parts of the secondary ratchet means;

Figure 9 is an enlarged fragmentary cross-sectional view taken on the line 9—9 in Figure 5 and showing the cam and rollers in their initial normal or de-energized position;

Figure 10 is a view similar to Figure 9 but showing the cam and rollers in the initial energized position;

Figure 11 is a view similar to Figures 9 and 10 showing the cam and rollers in their de-energized position after the initial energization; and Figure 12 is a partial sectional view of a modified form of the present invention.

Referring now more specifically to the drawings wherein like parts are designated by the same numerals throughout the various figures, a torque solenoid 10 embodying the principals of this invention is shown in Figures 1, 5, 6 and 7. In Figures 1 and 5, it is shown being utilized as a driver for a bank of rotary wafer switches, generally designated 11.

The torque solenoid 10 includes a substantially cylindrical housing or shell 12, provided with a laterally extending mounting means, such as flange 14, and an axial extending non-magnetic shaft 16 projecting from either end of the shell. The shell 12 is of a magnetic material, such as soft iron, and is provided at the end opposite flange 14 with an inwardly directed flange or stator ring 18 for purposes best shown hereinafter. Located within the shell is a helical coil 20 of suitable wire, wrapped in suitable insulation 21 and having leads 22 by means of which an electrical circuit may be completed through the coil to energize same. Co-axial with the coil is a fixed magnetic core 24 that fits within the coil and is flared at one end to engage the shell 12 so that a path of low magnetic reluctance is provided for the flux generated by the coil. It will be noted that the fixed magnetic core 24 does not extend completely through the shell 12, but instead extends only part way. At the opposite end of the shell 12, the inwardly directed flange or stator ring 18 is flared at its inner radial extent towards the fixed core 24 so as to complete the closure and encasement of the major portion of the coil 20. This flange 18 of the shell 12 is preferably integral but if desired may be made as a separate part and suitably attached thereto. A cover or end plate 26, preferably of a non-magnetic material and hereinafter described in greater detail, extends across the opening or aperture in flange 18 and is screwed or otherwise suitably held to the flange 18 as by screws 28.

The output shaft 16 is co-axially located with respect to the shell 12 and is supported at one end by a bearing 30 mounted in the fixed magnetic core 24. An axial bore 32 extends through the fixed magnetic core 24, and the shaft 16 passes through this bore and is supported at the other end of the shell 12 by a bearing means, such as provided in the aperture 34 on the end plate 26. A shoulder 36 is formed on the shaft 16 to bear against one portion of the bearing 30, this bearing being adapted to take both radially and axially directed loads. The opposite end of the shaft 16 is provided with a double reduction in diameters as at 38 and 40. This provides a shoulder 42 which bears against end plate 26 whereby shaft 16 is prevented from axial movement within the shell 12, but is permitted to freely rotate.

Between the inner end of the fixed magnetic core 24 and the end plate 26 is an annular space extending between the shaft 16 and the inner surface of flange 18. This space has a diameter slightly less than the inner diameter of the coil 20. An armature 44 having a diameter substantially equal to the inner surface diameter of flange 18 is positioned in this annular space. The axial length of armature 44 is substantially less than the distance between the inner end of the fixed magnetic core 24 and the outer end surface of flange 18. Thus, axial movement of the armature 44 is possible when the coil 20 is energized and de-energized. By suitable means, such as a non-magnetic shim or spacer 46, the armature 44 is maintained in spaced relation from the core 24 at all times so that a magnetic gap exists between these members.

A tubular member 48 surrounds the output shaft 16 and is freely slideable thereon. At one end the tubular member is rigidly connected to the armature 44 so that neither axial nor rotational movement of the tubular member relative to the armature 44 is possible. This is accomplished by means of abutting shoulders and a knurled section as indicated at 50. Other suitable means for associating these members can also be utilized. Tubular member 48 is fabricated so as to provide a high reluctance to magnetic lines of force. This can be accomplished through the proper choice of a particular shape, suitable materials or both.

The opposite end of the tubular member 48 is provided with a cam section 52 that cooperates with a pair of rollers 54 mounted upon the output shaft 16. As best seen in Figure 2, the shaft 16 is preferably flattened on diametrically opposite sides adjacent the bearing 36 and suitable means, such as a pin 56, holds the rollers 54 for rotation about an axis normal to the axis of shaft 16. Where size is of a critical nature, the rollers 54 can be eliminated and pin 56 be allowed to rest directly against cam 52. The cam 52 is of the crown type in which a cut of varying axial depth forms a cam surface 58 upon which the rollers 54 or the pin 56, acting as the cam followers, ride. The shape of the cam surface 58 is such that upon axial movement of the armature and associated tubular member 48, the rollers 54 riding on cam surface 58 will impart a rotary movement to shaft 16. While it is possible to give the cam surface 58 a uniform slope, so that equal incremental movements of the armature cause equal incremental angular movements of the shaft 16 in all positions of the armature, this is generally not desirable. Thus, at the beginning of the armature stroke, the force that is developed by the armature is less than that which is developed just before the end of its inward movement. Secondly, it is generally desirable to so shape the cam surface 58 as to compensate for this inequality of force. Thus, the cam surface is comparatively steep near the start of the stroke and shallow near the end of the stroke thereby developing a substantially uniform torque over the entire movement of the shaft if this is desired. Conversely, the torque can be varied by variations in the design of the cam surface.

It is highly desirable in devices of this character, to keep the reluctance of the magnetic circuit at an absolute minimum and to eliminate all air gaps or at the best, reduce them to a minimum. Thus, the juncture between the shell 12 and the core 24 is substantially negligible by manufacturing the core 24 as a press fit within the shell 12. The gap between the armature 44 and the core 24 is necessary for movement of the armature and the operation of the device but the gap between the armature 44 and the inner surface of flange 18 must be kept as small as possible. The cheapest and most feasible method for accomplishing the latter is by maintaining a minimum clearance between the armature 44 and flange 18 and then applying a dry surface lubricant, such as molybdenum disulfide or other suitable lubricating material, on the two adjacent surfaces.

For the proper operation of this device, it is imperative that the armature 44 be held against rotation during its linear movement in the energization cycle. In this improved form of torque solenoid, this is accomplished by suitable means, such as the ratchet elements best seen in Figures 3 and 5. The end of the armature 44 opposite to tubular member 52 is counterbored and provided with a ratchet 62. This can be a ratchet ring press fit or brazed in the counterbore of armature 44 or if feasible, milled from the parent material of armature 44 by elimination of the counterbore wall. Complimentary pawl means 64, in this instance having substantially the same number of teeth as ratchet 62, is mounted co-axially upon shaft 16. Pawl 64 is provided with radially extending slots 66 for the acceptance of tangs 68 mounted on restraining member 70. Restraining member 70 is positioned on the reduced portion 38 of shaft 16 by means of aperture 71 and is prevented from rotating relative to shell 16 by means of one or more pins 72 which extend inwardly from and are attached to end plate 26. These pins 72 engage in slots 74 in restraining member 70 and under some conditions will temporarily extend into slots 66 of the pawl 64. To insure the engagement of pawl 64 with ratchet 62 suitable means, such as leaf spring 76 mounted on shaft 16 and restrained by end plate 26, is provided to axially engage the teeth of pawl 64 with ratchet 62 substantially at all times.

A spring 78 interconnects armature 44 and shaft 16. Preferably, the spring 78 is located within a recess 80 formed in the end of the armature 44 co-axially with respect to the ratchet means 62. In the preferred embodiment, the spring takes the form of a form strip spring material with the outer end of the spring anchored to the armature 44 as by slot 82 and at the inner end by engagement with one or more flats 84 on the end of shaft 16 relatively adjacent end plate 26.

The spring 78 is so wound and connected to the shaft and armature as to resist the rotation of the shaft 16 caused by the operation of cam member 52. Thus, when the coil 20 is energized the armature is driven forward but held against retrograde rotation by means of the aforementioned ratchet assembly 62 and 64, while the shaft 16 is rotated against the urging of the spring but is held against axial movement by the bearing means 30. As a result the spring 78 is axially deflected as indicated in Figure 6 where it can be seen that in addition to being wound tighter by the rotation of the shaft 16, the spring is also displaced out of its normal plane by the axial but non-rotational movement of the armature 44. The further effect and use of the spring will be set forth hereinafter.

In this embodiment there is provided a secondary detent mechanism generally designated 90 fixed on shaft 16 adjacent the exterior face of the mounting flange 14 and core 24. It is comprised of a star wheel 92 nonrotatably mounted on shaft 16 and a detent roller 94. The detent roller 94 is positioned at one extremity of an arm 96 which is pivotally attached at its opposite end to the face plate 14 by suitable means, such as a screw 98. Roller 94 is urged into engagement with the star wheel by means of a tension coil spring 100 attached at one of its ends to a notched arm 102 struck out of material from along the upper edge of the arm 96. The opposite end of spring 100 is secured to a mounting post 104 by any suitable means, such as hook 106.

As the armature 44 is moved axially upon energization of the coil 20, it is prevented from rotation by means of the ratchet assembly 62—64 while the cam 52 acts against the rollers 54 causing the shaft 16 to rotate with roller 94 moving from one position in the star wheel 92, to a secondary notch or position. The spring 78 which has been wound tightly and axially deflected as shown in Figure 6 takes over when the coil 20 is de-energized. The detent means 94 and the star wheel 92 prevent the shaft 16 from rotating back to its initial position while the spring 78 keyed to the armature 44 by means of slot 82 shifts the armature 44 axially, to its initial position and by overriding pawl 64 rotates the ratchet 62 and armature 44 to a secondary postion with the high point of cam surface 58 coming to rest on the rollers 54 in readiness for the next energization, as seen in Figure 11. This can best be seen in Figures 9, 10 and 11 which are sections taken along the section lines in Figures 5, 6 and 7 respectively and showing the relative position of the cam and the rollers during the initial, the energized, and the de-energized conditions of the torque solenoid. Further movements of the output shaft 16 through angular increments "α" are immediately possible upon further energization of the coil 20.

It should be noted that on the energization of the coil 20, with the armature moving to the right in the drawings to a position of contact with the non-magnetic spacer 46, the inertial load of the rotating output shaft 16 and any part attached to the shaft will attempt to continue rotation of said shaft by overriding the forces exerted by the primary detent mechanisms engaged with armature 44. However, in the energized condition of coil 20, the magnetic field will cause the armature 44 to compress and frictionally engage spacer 46 attached to fixed core 24 thereby frictionally restraining the armature from rotating in the direction of the above-mentioned inertial load. The amount of restraint necessary to accomplish the above can be controlled by the proper selection of surface and compressibility in the materials utilized in spacer 46.

The shaft 16 can be provided at its exposed end adjacent the secondary detent means with suitable means, such as by flattening or being made non-circular in configuration, for engagement with and actuation of a workpiece of the type generally designated 11. In this instance the workpiece is a bank of rotary wafer switches 110 of known type which are suitably mounted to the operator, in this instance by means of screws 104 and spacer sleeves 112 positioned between adjacent switches.

By pre-loading the spring 78, it is possible to have any reasonable proportion of the energy of the solenoid available for the forward or advance movement, caused by the energization of the coil 20, while the remainder of the energy is available for the rotation of the armature and the overriding of the ratchet to the next position. Thus, in some instances, a fairly large amount of torque must be available for advancing a member while the return movement requires substantially no torque. In other cases little torque may be required on the advancement but a greater amount of torque may be required for the return portion of the movement. Any and all of these variations, and intermediate ones are available by the proper pre-loading of the spring 78.

In a similar manner, it is possible to control the angular movement of the shaft 16 in moving from one limiting position to the next by changing the shape of the cam surface 58. It will be appreciated, of course, that the change of cam shape to produce different angular amounts of rotation produces a corresponding change in the torque delivered to the output shaft 16. Essentially, the entire power for the rotation of the shaft 16 is secured from the movement of the armature 44, and while this power may be concentrated in a relatively small angle, or extended over a larger angle, the same amount of work will be done in each case.

A modification to the present invention is shown in the partial sectional view in Figure 12 wherein similar parts are designated by similar numerals with the addition of the suffix "a." It is possible to substitute in place of the economical star wheel 92 and detent roller 94 a pawl and ratchet mechanism of a type similar to the mechanism at the opposite end. This device is comprised of the following parts: a face type ratchet 116 fixed to shaft 16a, as by key 117, a face type pawl 118, having in this instance the same number of teeth as ratchet 116, a rotation restraining member 120 acting on pawl 118 and a leaf spring 122. These means are all mounted co-axially on shaft 16a and are maintained in axial position by a secondary end cover plate 124 having a pair of pins 126 projecting into the slots 128 in restraining member 120. Spring 122 acts axially against cover plate 124 to maintain the faces of ratchet and pawl, 116 and 118 respectively, in substantially constant contact. These parts correspond in individual function to parts 62, 64, 70, 76, 26, and 72 respectively of the ratchet means disclosed as being at the armature end in the primary embodiment. It should be noted, however, that the ratchet 116 and pawl 118 are of opposite hand to the ratchet 62 and pawl 64 of the primary embodiment to accomplish the desired control of rotation of the output shaft and armature in the same direction. This modification, therefore, discloses means for sealing all portions of the solenoid as well as both detent mechanisms from external conditions.

From the above description, it is seen that the present invention has provided a novel torque solenoid which rotates its output shaft in positive increments in a constant direction without axial movement in the output shaft. In addition, it is seen that the present invention has provided a novel rotary solenoid which is of relatively economical and rugged construction and which is capable of being formed in such a manner that the entire operator can be sealed off from surrounding conditions.

While the preferred embodiments of the present invention have been shown and described herein, it is obvious that many structural details may be changed without departing from the spirit and scope of the appended claims.

The invention is claimed as follows:

1. In a torque solenoid including an electro-magnetic flux inducing means, means for energizing said last mentioned means, an apertured armature, a hollow input shaft nonrotatably and co-axially fixed to said armature, an output shaft extending co-axially through said input shaft and armature, linear to rotary motion translation means interconnecting said input and output shafts, means for controlling rotation of said output shaft in angular increments in a single direction upon each energization of the electro-magnetic means, and means for controlling rotation of said input shaft in substantially the same angular increments in the same direction as the output shaft upon each de-energization of the electro-magnetic means.

2. A torque solenoid of the type claimed in claim 1 wherein the rotary motion translation means includes a crown cam mounted on the end of the input shaft opposite to its attachment to the armature and cam follower rollers mounted on the output shaft, said input shaft being retained in a non-rotary condition by said rotation controlling means during each energization while said output shaft is incrementally rotated to a new angular position, said output shaft being retained in a non-rotary condition in said new angular position during de-energization by said second rotary controlling means while said input shaft rotates a substantially equal angular increment and retracts to its initial linear position.

3. A torque solenoid of the type claimed in claim 1 wherein the means for controlling rotation of the shafts includes a pair of face type axially spring-loaded ratchet means, one ratchet means being mounted in controlling association with the armature and the second ratchet means being of opposite hand and being mounted in controlling association with the output shaft.

4. A torque solenoid of the character described comprising an input shaft, an armature fixed to said input shaft, an output shaft, electro-magnetic means for inducing linear movement in said input shaft, cam means mounted on the end of said input shaft opposite said armature, first means mounted on said output shaft for engagement with said cam means for the translation of the linear movement of said armature to rotary movement in said output shaft, second means on said output shaft for restraining said output shaft and preventing axial movement relative to said electro-magnetic means, means positioned adjacent said armature for preventing rotation of said armature during energization of said electro-magnetic means but permitting rotation of said armature upon de-energization of said electro-magnetic means, third means acting on said output shaft which permits rotation of said shaft in a given direction upon energization of said electro-magnetic means but preventing rotation of said shaft upon de-energization of said electro-magnetic means whereby said output shaft can be rotated in angular increments in a constant direction.

5. In a torque solenoid comprising a substantially cylindrical shell of a material having a low magnetic reluctance having outwardly extending mounting means at one end and being flared inwardly at the opposite end, a fixed core arranged co-axially within said shell having an axially extending bore and being flared at one end said flared end being in intimate relationship with the inner surface of said shell adjacent said mounting means, a helically wound coil positioned co-axially between said shell and said core, electrical leads from said coil to the exterior of said shell, a non-magnetic shaft extending through said shell and forming an annular space between said shaft and the inner surface formed by said flared portion of the shell and said coil, a cover plate mounted on the end of said flared portion of the shell and having a central bearing aperture and a pair of inwardly extending pins mounted on said cover plate, bearing means mounted within said core and within said cover plate for supporting said shaft, means on said shaft for restraining the shaft against axial movement relative to said shell, an armature surrounding said shaft and positioned in the aforesaid annular space, tubular means surrounding said shaft and positively connected to said armature at the inner end thereof, crown cam means at the opposite end of said tubular means attached to said shaft for following engagement with said crown cam means, spring means attached to and resisting relative rotation between said shaft and said armature, a detent mechanism mounted on the output shaft said mechanism permitting movement in a single rotary direction during the energization of the electro-magnetic means while restraining the output shaft from all rotation during the de-energization of said means, ratchet means mounted co-axially with said armature to prevent rotation of the armature during energization of said electro-magnetic means but allowing rotation of the armature upon de-energization of the electro-magnetic means in the same direction as the rotation of the output shaft, whereby said torque solenoid is capable of producing rotational power in incremental angular amounts in a constant direction.

6. A device of the type claimed in claim 5 wherein a compressible non-magnetic spacer is attached to the fixed core at the end opposite the flared end of said core, at least the exposed face of said spacer having a high coefficient of friction.

References Cited in the file of this patent

UNITED STATES PATENTS

| 1,802,459 | Caruso | Apr. 28, 1931 |
| 2,820,370 | Dolish | Jan. 21, 1958 |
| 2,828,636 | Hall | Apr. 1, 1958 |

FOREIGN PATENTS

| 863,091 | France | Jan. 26, 1940 |